(12) United States Patent
Yokoyama

(10) Patent No.: US 6,658,211 B1
(45) Date of Patent: Dec. 2, 2003

(54) OPTICAL SIGNAL REPEATER AND OUTPUT LEVEL CONTROL METHOD USED IN THIS REPEATER

(75) Inventor: Ryu Yokoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 620 days.

(21) Appl. No.: 09/605,711

(22) Filed: Jun. 27, 2000

(30) Foreign Application Priority Data

Jun. 28, 1999 (JP) .......................................... 11-182489

(51) Int. Cl.[7] ................................................ H04J 14/02
(52) U.S. Cl. ................................ 398/79; 398/9; 398/18; 398/33; 398/178; 398/94; 398/95; 398/82; 398/87; 359/341.3; 359/341.12
(58) Field of Search ............................ 398/9, 177, 18, 398/33, 178, 79, 94, 95, 82, 87; 359/341.3, 341.12

(56) References Cited

U.S. PATENT DOCUMENTS

| 5,504,609 A | | 4/1996 | Alexander et al. | |
| 5,870,217 A | * | 2/1999 | Itou | 359/179 |
| 6,108,123 A | * | 8/2000 | Kinoshita | 359/337 |
| 6,160,658 A | * | 12/2000 | Ishikawa | 359/337 |

FOREIGN PATENT DOCUMENTS

| EP | 0 865 173 A2 | 9/1998 |
| JP | 4-78827 | 3/1992 |
| JP | 7-336327 | 12/1995 |
| JP | 9-326770 | 12/1997 |
| JP | 10-51397 | 2/1998 |
| JP | 10-54922 | 2/1998 |
| JP | 11-68204 | 3/1999 |
| JP | 11-74595 | 3/1999 |

OTHER PUBLICATIONS

Motoshima et al., "Automatic Gain Control of Erbium–Doped Fiber Amplifiers for WDM Transmission Systems", *IEICE Transactions on Communications*, vol. E80–B, No. 9, pp. 1311–1320, Sep. 1997.

* cited by examiner

*Primary Examiner*—Leslie Pascal
*Assistant Examiner*—Hanh Phan
(74) *Attorney, Agent, or Firm*—Whitham, Curtis & Christofferson, P.C.

(57) ABSTRACT

An optical signal repeater, in which an output level of each optical signal of WDM optical signals does not change even when the number of wavelengths of inputted WDM optical signals changes, amplifies WDM optical signals transmitted from an optical transmitter via an optical fiber transmission line. A pumping light source outputs pumping light used for amplifying the WDM optical signal. A multiplexer transmits the pumping light to an amplifier, and a splits the amplified WDM optical signals into two parts. A wavelength selection type reflector reflects only an optical signal having a specified wavelength in one part of the amplified WDM optical signals. An automatic output level controller controls the pumping light output from the pumping light source so that the power level becomes a designated level. A reflected optical signal transmitter transmits the optical signal having the specified wavelength reflected to the automatic output level controller.

4 Claims, 3 Drawing Sheets

OPTICAL SIGNAL REPEATER AND OUTPUT LEVEL CONTROL METHOD USED IN THIS REPEATER

BACKGROUND OF THE INVENTION

The present invention relates to an optical signal repeater at a wavelength division multiplex (WDM) system, in particular, which can control an output level of each optical signal of WDM optical signals to be outputted to a designated value, and an output level control method used this repeater.

DESCRIPTION OF THE RELATED ART

Japanese Patent Application Laid-Open No. HEI 9-326770 discloses a linear repeater using for a WDM system. In this application, at an output stage of an optical amplifier in which WDM optical signals to be transmitted are amplified, a part of the amplified optical signals is split at an optical splitter. These WDM optical signals split at the optical splitter are inputted to a variable wavelength optical filter that can variably control transmitting wavelength to be transmitted in each optical signal. An optical signal transmitted through this variable wavelength optical filter is inputted to an automatic gain control (AGC) section, and the gain of each optical signal is controlled to a designated value by monitoring the power level of the optical signal inputted to the AGC section.

FIG. 1 is a block diagram showing a conventional optical signal repeater using for a WDM system. This conventional optical signal repeater consists of an optical fiber transmission line 11 in which WDM optical signals are transmitted, an optical amplifier 12 which amplifies the transmitted WDM optical signals, an optical multiplexer 13, an optical splitter 14 which splits the amplified WDM optical signals outputted from the optical amplifier 12 into two parts, a pumping laser diode (LD) 17 being a pumping light source, a variable wavelength optical filter 18 which can variably control transmitting wavelength of the WDM optical signals to be transmitted in each optical signal, and an AGC section 19. FIG. 2 is a block diagram showing gain control operation of the conventional optical signal repeater shown in FIG. 1. In FIG. 2, a broken line from the pumping LD 17 shows a flow of pumping light and the other broken lines show flows of optical signals. And spectra of the optical signals are also shown in FIG. 2. In these spectra, the vertical axis shows the optical power level and the horizontal axis shows the optical wavelength.

At this conventional optical signal repeater, the output level of each optical signal of the transmitted WDM optical signals is controlled to a designated level by using the following method. That is, a part of the WDM optical signals outputted from the optical amplifier 12 is split at the optical splitter 14, and each optical signal of the split WDM optical signals is transmitted through the variable wavelength optical filter 18. The transmitted optical signal is inputted to the AGC section 19, and the AGC section 19 controls the output from the pumping LD 17 so that the power level of each optical signal inputted to the AGC section 19 is kept in a designated level.

At this kind of optical signal output level control method, the AGC section 19 controls the output of the pumping LD 17 so that the output level of each optical signal of the WDM optical signals becomes a designated level, without any relation with the power level of the WDM optical signals inputted to the optical signal repeater. Therefore, each optical signal transmitting through the optical fiber transmission line 11 is amplified to a designated level without any relation with the power levels of the inputted WDM optical signals at the optical fiber transmission line 11. Consequently, it is possible to realize a WDM optical signal transmission system in which the fluctuation of the outputting optical power level of each optical signal is reduced.

However, at the conventional optical signal repeater mentioned above, there are several problems. First, at the conventional optical signal repeater, a part of the optical signals is transmitted through the variable wavelength optical filter 18 and inputted to the AGC section 19. And the variable wavelength optical filter 18 provides a driving unit (not shown) which varies the transmitting wavelength, however, there is a problem that this driving unit does not have high reliability.

Secondly, a circuit, which controls the transmitting wavelength through the variable wavelength optical filter 18, is additionally required, as a result, the structure of the optical signal repeater becomes complex.

Thirdly, at the variable wavelength optical filter 18, it is difficult to make the transmitting wavelength band narrow, therefore optical signals adjacent to the optical signal to be transmitted leak and the leaked adjacent optical signals are inputted to the AGC section 19. As a result, it is difficult to monitor the input level of each optical signal to the AGC section 19 precisely.

Moreover, in order to avoid making the adjacent optical signals input to the AGC section 19, it is required that the adjacent wavelengths are positioned at the far positions from the optical signal to be transmitted. Therefore, there is a problem that the number of the wavelengths to be multiplexed is limited in the amplifying wavelength band.

SUMMARY OF THE INVENTION

It is therefore an object of the present invention to provide an optical signal repeater and an output level control method used this repeater, in which the output level of each optical signal of the WDM optical signals does not change even when the number of inputted WDM optical signals changes, and which is able to have high reliability and can be a simple structure, further is applicable for a system in which intervals among WDM optical signals are relatively narrow.

According to a first aspect of the present invention, for achieving the object mentioned above, there is provided an optical signal repeater, which is used at an optical fiber transmission system providing with an optical fiber transmission line, an optical transmitter, and an optical receiver. The optical signal repeater provides an optical signal amplifying means for amplifying wavelength division multiplexed (WDM) optical signals transmitted from the optical transmitter via the optical fiber transmission line, a pumping light source which outputs pumping light using for amplifying the WDM optical signals, an optical signal multiplexer which transmits the pumping light to the optical signal amplifying means, an optical splitter which splits the amplified WDM optical signals into two parts, a wavelength selection type reflection means which reflects only an optical signal having a specified wavelength in one part of the amplified WDM optical signals split at the optical splitter, an automatic output level controller to which the optical signal having the specified wavelength is inputted and which controls the pumping light outputting from the pumping light source so that the power level of the optical signal having the specified wavelength reflected from the wavelength selection type reflection means becomes a designated level, and a reflected optical signal transmitting means which transmits the optical signal having the specified wavelength reflected at the wavelength selection type reflection means to the automatic output level controller.

According to a second aspect of the present invention, in the first aspect, the optical splitter provides the reflected optical signal transmitting means.

According to a third aspect of the present invention, in the first aspect, the wavelength selection type reflection means is an optical fiber grating filter.

According to a fourth aspect of the present invention, there is provided an optical signal output level control method, which provides the steps of; inputting WDM optical signals transmitted from an optical transmitter via an optical fiber transmission line to an optical signal amplifying means, inputting pumping light to the optical signal amplifying means, amplifying the inputted WDM optical signals, splitting the amplified WDM optical signals into two parts, outputting main part of the split amplified WDM optical signals to an optical receiver via said optical fiber transmission line, inputting one part of the split amplified WDM optical signals to a wavelength selection type reflection means, reflecting only an optical signal having a specified wavelength in one part of the split amplified WDM optical signals at the wavelength selection type reflection means, inputting the optical signal having the specified wavelength to an automatic output level controller, and controlling the pumping light so that the power level of the optical signal having the specified wavelength becomes a designated level at the automatic output level controller.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
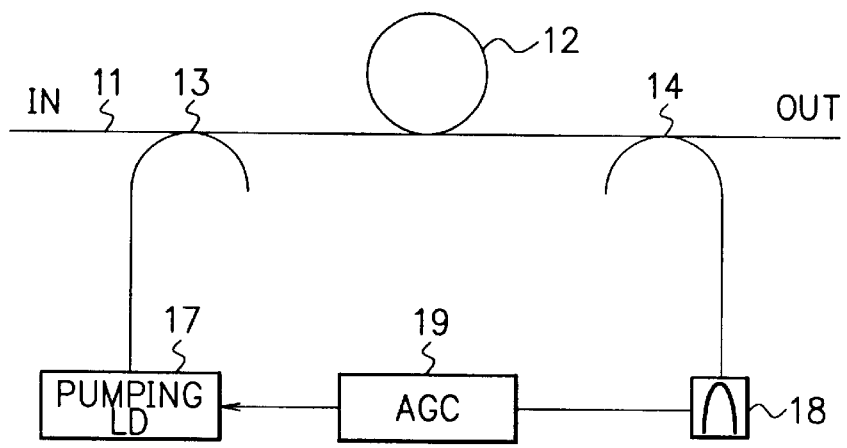
FIG. 1 is a block diagram showing a conventional optical signal repeater using for a WDM system.
Figure 2:
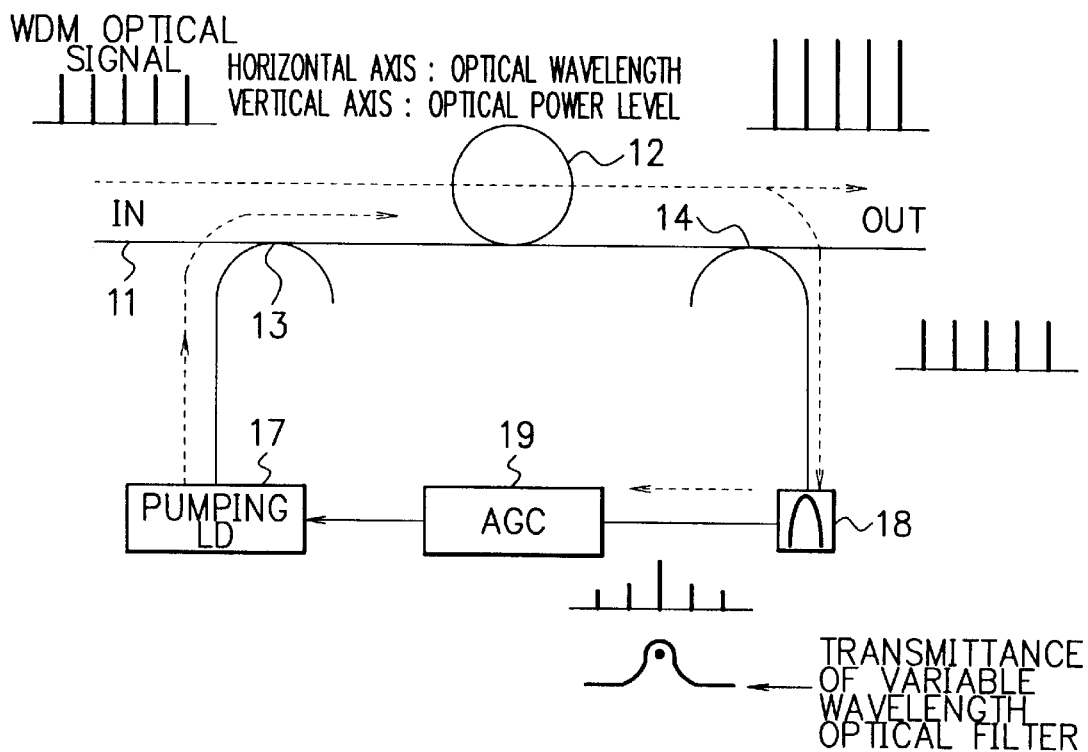
FIG. 2 is a block diagram showing gain control operation of the conventional optical signal repeater shown in FIG. 1.
Figure 3:
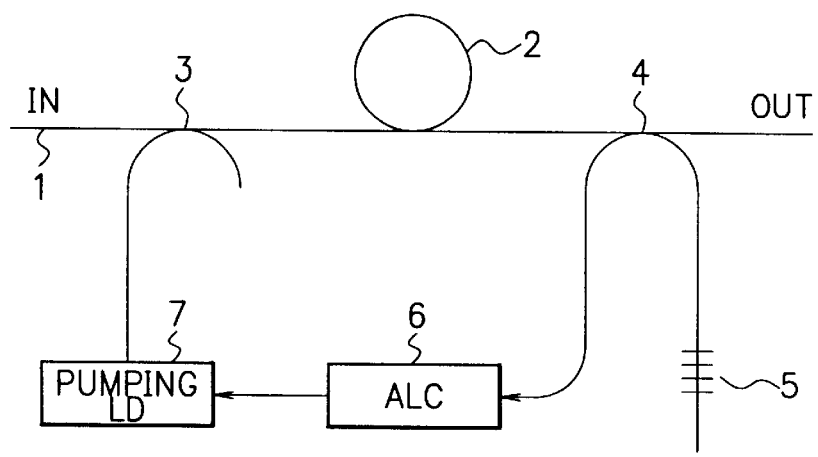
FIG. 3 is a block diagram showing a first embodiment of an optical signal repeater using for a WDM system of the present invention.

Referring now to the drawings, embodiments of the present invention are explained in detail. FIG. 3 is a blocking diagram showing a first embodiment of an optical signal repeater used in a WDM system of the present invention. This optical signal repeater is used in an optical fiber transmission system that provides an optical transmission line 1, an optical transmitter 10 that transmits WDM optical signals to the optical fiber transmission line 1, and an optical receiver 20 that receives the transmitted optical signals.

As shown in FIG. 3, the optical signal repeater of the present invention consists of an optical fiber transmission line 1, an optical amplifier 2, an optical multiplexer 3, an optical splitter 4, an optical fiber grating filter (wavelength selection type reflection means) 5, an automatic output level controller (ALC) 6, and a pumping laser diode (LD) 7 being a pumping light source.

The optical amplifier 2 amplifies WDM optical signals, whose wavelengths are different from one another, transmitting through the optical fiber transmission line 1. This optical amplifier 2 is an optical amplifier that provides such as an erbium doped optical fiber.

The optical multiplexer 3 is provided at the input side of the optical amplifier 2, and inputs pumping light from the pumping LD 7 to the optical amplifier 2 in which the pumping light is used for amplifying the inputted WDM optical signals. And the optical splitter 4 is provided at the output side of the optical amplifier 2, and which splits the WDM optical signals amplified at the optical amplifier 2 into two parts. That is, the main part split at the optical splitter 4 is outputted to the optical receiver (not shown) via the optical fiber transmission line 1, and a part of the amplified WDM optical signals split at the optical splitter 4 is outputted to the optical fiber grating filter 5.

The optical fiber grating filter 5 which reflects only an optical signal having a specified wavelength in the optical signals split at the optical splitter 4. The ALC 6 to which the optical signal having the specified wavelength is inputted and monitors the power level of this inputted optical signal and controls the power level of the inputted optical signal to a designated level by controlling the pumping light outputting from the pumping LD 7. In this, the optical signal having the specified wavelength reflected at the optical fiber grating filter 5 is inputted to the ALC 6 via the optical splitter 4. The pumping LD 7 is positioned between the ALC 6 and the optical multiplexer 3.

Figure 4:
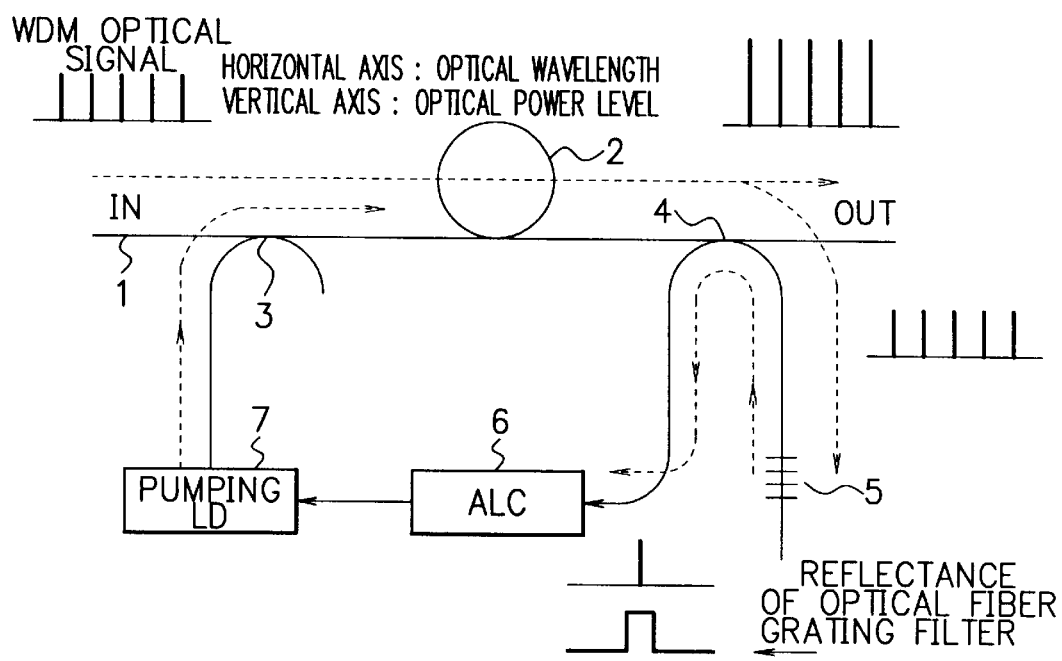
FIG. 4 is a block diagram showing operation of the first embodiment of the optical signal repeater of the present invention shown in FIG. 3.

FIG. 4 is a block diagram showing operation of the first embodiment of the optical signal repeater of the present invention shown in FIG. 3. Referring to FIG. 4, the operation of the first embodiment of the present invention is explained. In FIG. 4, a broken line from the pumping LD 7 shows a flow of pumping light and the other broken lines show flows of optical signals. And spectra of the optical signals are also shown in FIG. 4. In these spectra, the vertical axis shows the optical power level and the horizontal axis shows the optical wavelength.

First, when WDM optical signals transmitted from the optical transmitter (not shown) via the optical fiber transmission line 1 are inputted to the optical signal repeater, the inputted WDM optical signals are amplified at the optical amplifier 2 and outputted. In this, the gain of the optical amplifier 2 is controlled by changing the power of the pumping light inputted to the optical amplifier 2.

Next, the optical splitter 4 splits the WDM optical signals amplified at the optical amplifier 2 into two parts. The main part of the amplified WDM optical signals is outputted to the optical receiver (not shown) via the optical fiber transmission line 1. A part of the amplified WDM optical signals is inputted to the optical fiber grating filter 5. The optical fiber grating filter 5 reflects only an optical signal having a specified wavelength in the WDM optical signals inputted to the optical fiber grating filter 5. The optical signal having the specified wavelength reflected at the optical fiber grating filter 5 is inputted to the ALC 6 via the optical splitter 4. The ALC 6 controls the output from the pumping LD 7 so that the power level of the optical signal inputting to the ALC 6 becomes always a designated level.

As mentioned above, by controlling the output level of an optical signal having a specified wavelength to a designated level, even when the number of the wavelengths of the inputted WDM optical signals changes, the optical signal having the specified wavelength reflected at the optical fiber grating filter 5 is included in the WDM optical signals to be amplified. Therefore, the output level of each optical signal of the WDM optical signals does not change. And even when the number of the WDM optical signals does not change and the input level changes, the output level is controlled to a designated level.

At the first embodiment of the optical signal repeater of the present invention, only one optical signal having one wavelength is selected and extracted from the WDM optical signals and the output level of the selected and extracted only one optical signal is controlled to a designated level. Therefore, even when the number of the wavelengths of the inputted WDM optical signals changes, the output level at each wavelength can be kept in a designated level. And even when the number of the wavelengths does not change and the input level changes, the output level can be kept in a designated level.

And the wavelength to be selected and extracted is fixed, therefore a control means to vary the wavelength to be selected and extracted is not needed and the structure can be simple. Moreover, by using an optical fiber grating filter which can make the reflecting wavelength band very narrow as a means for extracting a specified optical signal, it is possible to extracts only a desired optical signal precisely. Therefore, without any influence from adjacent optical signals, the output level can be controlled precisely.

And as a means for selecting and extracting a wavelength, an optical fiber grating filter being one of fiber components is used, therefore the present invention can achieve high reliability compared with a system using a device such as lenses. And the optical splitter 4 has two functions. That is, one function is to input the split optical signal to the optical fiber grating filter 5, and the other function is to transmit the optical signal having the specified wavelength reflected at the optical fiber grating filter 5 to the ALC 6. Therefore, the circuit structure can be simplified and the assembling time is shortened, consequently the optical signal repeater can be provided in a low cost.

At the first embodiment of the optical signal repeater of the present invention, as a wavelength selection type reflection means which makes only one optical signal having a specified wavelength reflect in the optical signals split at the optical splitter 4, the optical fiber grating filter 5 is used, consequently a variable wavelength optical filter used in the conventional optical signal repeater is not needed. Therefore, even when the number of the inputted WDM optical signals changes, the output level of each optical signal of the WDM optical signals does not change. Consequently, the high reliability can be achieved and the circuit structure can be simplified, and the optical signal repeater of the present invention can be applied to a system in which intervals among optical signals are relatively narrow.

Figure 5:
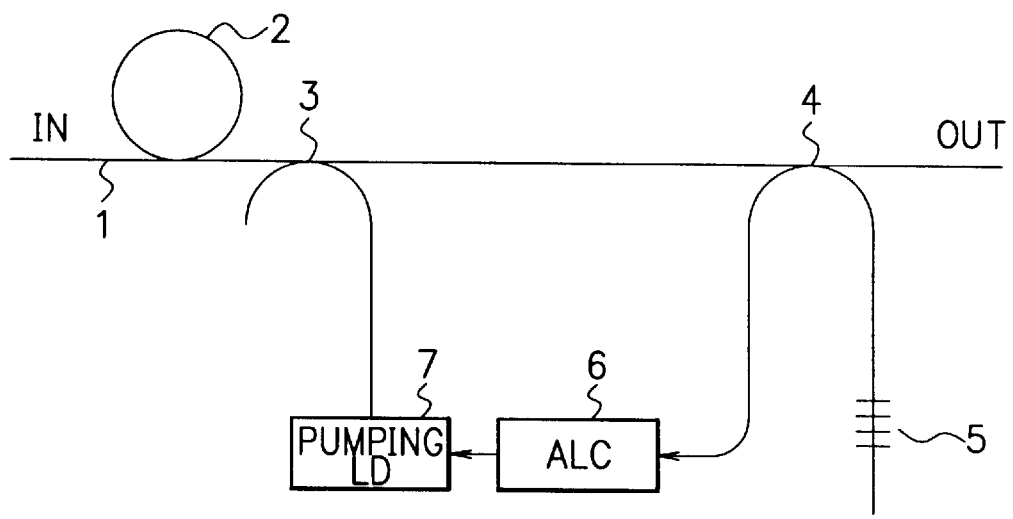
FIG. 5 is a block diagram showing a second embodiment of the optical signal repeater using for a WDM system of the present invention.

Next, a second embodiment of the optical signal repeater of the present invention is explained. FIG. 5 is a block diagram showing the second embodiment of the optical signal repeater using for a WDM system of the present invention. As shown in FIG. 5, at the second embodiment, the pumping light outputted from the pumping LD 7 is inputted to the back side of the optical amplifier 2. And the optical splitter 4 which splits the amplified optical signals into two parts is disposed behind the optical multiplexer 3 which transmits the pumping light to the optical amplifier 2.

This second embodiment achieves the same effect as the first embodiment achieves.

Figure 6:
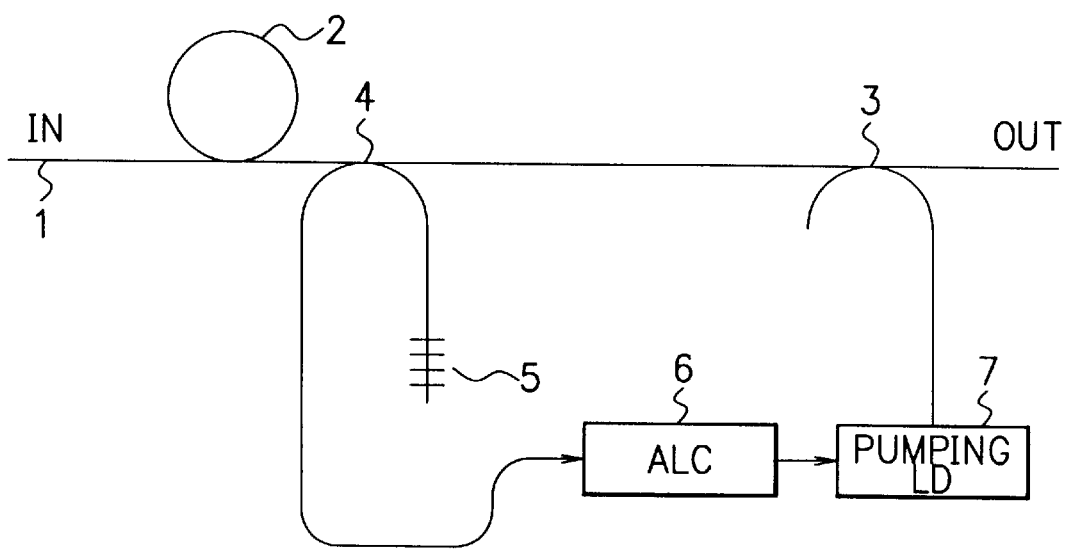
FIG. 6 is a block diagram showing a third embodiment of the optical signal repeater using for a WDM system of the present invention.

FIG. 6 is a block diagram showing a third embodiment of the optical signal repeater using for a WDM system of the present invention. Referring to FIG. 6, the third embodiment is explained. At the third embodiment, as the same as the second embodiment, the pumping light outputted from the pumping LD 7 is inputted to the back side of the optical amplifier 2. And the optical splitter 4 which splits the amplified optical signals into two parts is disposed in front of the optical multiplexer 3 which transmits the pumping light to the optical amplifier 2. This third embodiment achieves the same effect as the first embodiment achieves.

As mentioned above, the optical signal repeater of the present invention is used at an optical fiber transmission system providing with an optical fiber transmission line, an optical transmitter, and an optical receiver. The optical signal repeater provides an optical signal amplifying means for amplifying wavelength division multiplexed (WDM) optical signals transmitted from the optical transmitter via the optical fiber transmission line, a pumping light source which outputs pumping light using for amplifying the WDM optical signals, an optical signal multiplexer which transmits the pumping light to the optical signal amplifying means, an optical splitter which splits the amplified WDM optical signals into two parts, a wavelength selection type reflection means which reflects only an optical signal having a specified wavelength in one part of the amplified WDM optical signals split at the optical splitter, an automatic output level controller to which the optical signal having the specified wavelength is inputted and which controls the pumping light outputting from the pumping light source so that the power level of the optical signal having the specified wavelength reflected from the wavelength selection type reflection means becomes a designated level, and a reflected optical signal transmitting means which transmits the optical signal having the specified wavelength reflected at the wavelength selection type reflection means to the automatic output level controller.

As mentioned above, the optical signal repeater selects and extracts one optical signal having a specified wavelength and controls the output level of the selected and extracted the optical signal having the specified wavelength, therefore even when the number of wavelengths of the inputted WDM optical signals changes, the output level of each optical signal can be kept in a designated level. And even when the number of the wavelengths does not change and the input level changes, the output level can be kept in a designated level.

And the wavelength to be selected and extracted is fixed, therefore a control means to vary the wavelength to be selected and extracted is not needed and the structure can be simple.

And the optical signal repeater of the present invention provides a wavelength selection type reflection means which can reflect only an optical signal having a specified wavelength. Therefore, the variable wavelength optical filter used in the conventional optical signal repeater is not needed, and even when the number of wavelengths of the inputted WDM optical signals changes, the output level of each optical signal of the inputted WDM optical signals does not change, the optical repeater is able to have high reliability, and its structure can be simplified. Moreover, the present invention is applicable to a system in which intervals among WDM optical signals are relatively narrow.

As the wavelength selection type reflection means, an optical fiber grating filter which can make the reflecting wavelength band very narrow is used as a means for extracting a specified optical signal. Consequently, it is possible to extract only a desired optical signal precisely, and without any influence from adjacent optical signals, the output level can be controlled precisely.

And as a means for selecting and extracting a wavelength, an optical fiber grating filter being one of fiber components is used, therefore the present invention can achieve high reliability compared with a system using a device such as lenses. And the optical splitter has two functions. That is, one function is to input the split optical signal to the wavelength selection type reflection means, and the other function is to transmits the optical signal having the specified wavelength reflected at the wavelength selection type reflection means to the automatic output level controller. Therefore, the circuit structure can be simplified and the assembling time is shortened, consequently the optical signal repeater can be provided in a low cost.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An optical signal repeater, which is used at an optical fiber transmission system provided with an optical transmission line, an optical transmitter, and an optical receiver, comprising:

an optical signal amplifying means for amplifying wavelength division multiplexed (WDM) optical signals transmitted from said optical signal transmitter via said optical fiber transmission line;

a pumping light source which outputs pumping light used for amplifying said WDM optical signals;

an optical signal multiplexer which transmits said pumping light to said optical signal amplifying means;

an optical splitter which splits said amplified WDM optical signals into two parts;

a wavelength selection type reflection means which reflects only on optical signal having a specified wavelength in one part of said amplified WDM optical signals split at said optical splitter;

an automatic level controller to which said optical signal having the specified wavelength is inputted and which controls said pumping light output from said pumping light source so that the power level of said optical signal having the specified wavelength reflected from said wavelength selection type reflection means becomes a designated level; and a reflected optical signal transmitting means which transmits said optical signal having the specified wavelength reflected at said wavelength selection type reflection means to said automatic output level controller.

2. An optical signal repeater in accordance with claim 1, wherein:

said optical splitter provides said reflected optical signal transmitting means.

3. An optical signal repeater in accordance with claim 1, wherein:

said wavelength selection type reflection means is an optical fiber grating filter.

4. An optical signal output level control method, comprising the steps of:

inputting WDM optical signals transmitted from an optical transmitter via an optical fiber transmission line to an optical signal amplifying means;

inputting pumping light to said optical signal amplifying means;

amplifying said inputted WDM optical signals;

splitting said amplified WDM optical signals into two parts;

outputting main part of said split amplified WDM optical signals to an optical receiver via said optical fiber transmission line;

inputting one part of said split amplified WDM optical signals to a wavelength selection type reflection means;

reflecting only an optical signal having a specified wavelength in one part of said split amplified WDM optical signals at said wavelength selection type reflection means;

inputting said optical signal having the specified wavelength to an automatic output level controller; and controlling said pumping light so that the power level of said optical signal having the specified wavelength becomes a designated level at said automatic output level controller.

* * * * *